(12) United States Patent
Thomas et al.

(10) Patent No.: US 7,978,884 B1
(45) Date of Patent: Jul. 12, 2011

(54) FINGERPRINT SENSOR AND INTERFACE

(75) Inventors: Christopher Thomas, San Diego, CA (US); Octavian Popescu, New Westminster (CA); Jun Ye, San Diego, CA (US)

(73) Assignee: SMSC Holdings S.a.r.l., Luxembourg (LU)

( * ) Notice: Subject to any disclaimer, the term of this patent is extended or adjusted under 35 U.S.C. 154(b) by 1011 days.

(21) Appl. No.: 11/832,763

(22) Filed: Aug. 2, 2007

Related U.S. Application Data

(60) Provisional application No. 60/836,333, filed on Aug. 8, 2006.

(51) Int. Cl.
*G06K 9/00* (2006.01)
*G06K 7/00* (2006.01)
*G05B 19/00* (2006.01)

(52) U.S. Cl. ........ 382/124; 382/115; 382/312; 340/5.83

(58) Field of Classification Search .................. 382/100, 382/115, 124, 312, 127; 713/186, 182, 185, 713/187, 189, 2, 1; 356/71; 340/5.83, 825, 340/5.1, 5.8, 5.81, 5.82; 345/156; 257/40, 257/414, 252, 213; 710/8, 1
See application file for complete search history.

(56) References Cited

U.S. PATENT DOCUMENTS

| 4,429,413 | A | 1/1984 | Edwards | |
|---|---|---|---|---|
| 7,194,116 | B2 * | 3/2007 | Du et al. | 382/124 |
| 7,197,168 | B2 * | 3/2007 | Russo | 382/125 |
| 7,212,658 | B2 * | 5/2007 | Du et al. | 382/124 |
| 7,289,649 | B1 | 10/2007 | Walley et al. | |
| 7,460,696 | B2 * | 12/2008 | Rowe | 382/124 |
| 2002/0012455 | A1 | 1/2002 | Benckert | |
| 2002/0050518 | A1 * | 5/2002 | Roustaei | 235/454 |
| 2004/0208348 | A1 | 10/2004 | Baharav et al. | |
| 2006/0069826 | A1 | 3/2006 | Lei et al. | |
| 2006/0078178 | A1 * | 4/2006 | Shatford | 382/124 |
| 2006/0280346 | A1 * | 12/2006 | Machida | 382/124 |
| 2006/0294394 | A1 * | 12/2006 | Cheng et al. | 713/186 |
| 2007/0154073 | A1 | 7/2007 | Hamid et al. | |

OTHER PUBLICATIONS

U.S. Appl. No. 11/837,532, Thomas.

\* cited by examiner

*Primary Examiner* — Sheela C Chawan

(57) ABSTRACT

A fingerprint sensor interface that connects to a standard camera interface and minimizes input and output signals to reduce sensor die area and cost. The sensor can connect to a standard camera interface of a cellular telephone baseband processor or other device intended to receive signals from a camera. Input and output pad are arranged on a single edge of the die. Circuitry between the pads and the sensor active array creates clearance from the array to the bond wires connected to the pads.

7 Claims, 6 Drawing Sheets

FINGERPRINT SENSOR AND INTERFACE

RELATED APPLICATIONS

This application claims priority from U.S. provisional patent application Ser. No. 60/836,333 filed Aug. 8, 2006, entitled "Fingerprint sensor and interface", incorporated herein by reference.

BACKGROUND

1. Field of the Invention

The present invention relates to object scanning and specifically to the electrical interface and design of a fingerprint sensor.

2. Prior Art

Fingerprint scanners are one form of biometric verification used to access data and devices. Devices that have potential use for biometric verification include laptop computers, personal digital assistants, cellular or mobile telephone handsets, and any other device requiring access restriction or security. Mobile telephone handsets commonly incorporate a camera for capturing still and moving images but are not suitable for fingerprint scanning due to the optics, image area, and lack of proper excitation to measure ridge and valleys of fingerprints.

Fingerprint sensing technology is well known. One method uses an alternating current excitation signal that propagates an electric field through the finger while a capacitive sensor detects the ridges and valleys in the living layer of skin beneath the skin surface. A fingerprint scanner is typically a two-dimensional sensor array with a pixel width count much larger than the pixel height count. Pixel dimensions of 128 by 8 or 12 and 192 by 16 are common, and other pixel sizes and aspect ratios can be used. The finger is manually swiped across the sensor.

Consecutive images are captured as the fingerprint passes across the sensor and are combined to form a full image of the fingerprint.

Standard fingerprint scanners interface to a host device using a specialized interface intended for the scanner or a general purpose interface such as universal serial bus (USB) See Lei et al., U.S. patent application publication US 2006/0069826 published Mar. 30, 2006 for an example of a fingerprint sensor that interfaces to an external computing device over USB.

A specialized interface for the sensor precludes compatibility with existing devices that are not designed with a physical layer interface suitable for connection to the sensor. A USB interface in a fingerprint sensor requires significant die area on the device and thereby increases cost of the sensor.

Fingerprint scanners have special mechanical and electrical needs due to the exposure of the active sensor area. The sensor must be exposed for the finger to contact with the sensor. Electrostatic discharge (ESD) protection must be provided on the sensor chip, which uses die area around the active sensor region.

Reduction of the number of interface signals is highly desirable. Each input or output (I/O) pin requires a bonding pad on the integrated circuit, which uses die area and thus increases cost. The pad can be used for connection to a bump or a bond wire. Additionally, mechanical clearance distances are required between the bonding pads and the active sensor array. Reduction in the number of pads reduces clearance requirements and reduces die size.

An interface to standard processor devices is desirable to increase compatibility and avoid redesign of existing processors. A low cost sensor is desirable, which requires minimizing die area and I/O pad count.

SUMMARY OF THE INVENTION

A fingerprint sensor device with an electrical interface that is compatible with a standard camera interface and minimizes pin count of the device. In one embodiment, the fingerprint scanner connects to a cellular telephone baseband chip set as a conventional digital camera. The fingerprint scanner can connect simultaneously to the same bus as the camera with each device selectively enabled, using either a command or an enable pin. Pin out is minimized while providing compatibility with a standard camera interface by transmitting sensor pixel data serially and providing a control and status interface on a serial data bus. In order to allow hardware compatibility with a standard camera interface, software can process the data from the sensor transmitted on one or more data lines of the camera interface. The data bits are organized into pixel values. The row and column ordering of the readout of the sensor may need reorganizing to create an image array. Binarization of the multilevel sensor pixel values can produce a 1-bit bi-level fingerprint image, either on-chip or on the host processor. Conventional fingerprint recognition software can be used to process the series of processed images output from the sensor array.

The integrated circuit can be designed so that input and output (I/O) pads are along only one short edge if the IC. The digital and analog circuitry of the IC is placed between the I/O pads and the active sensor array to create a clearance distance.

DETAILED DESCRIPTION OF THE INVENTION

Figure 1:
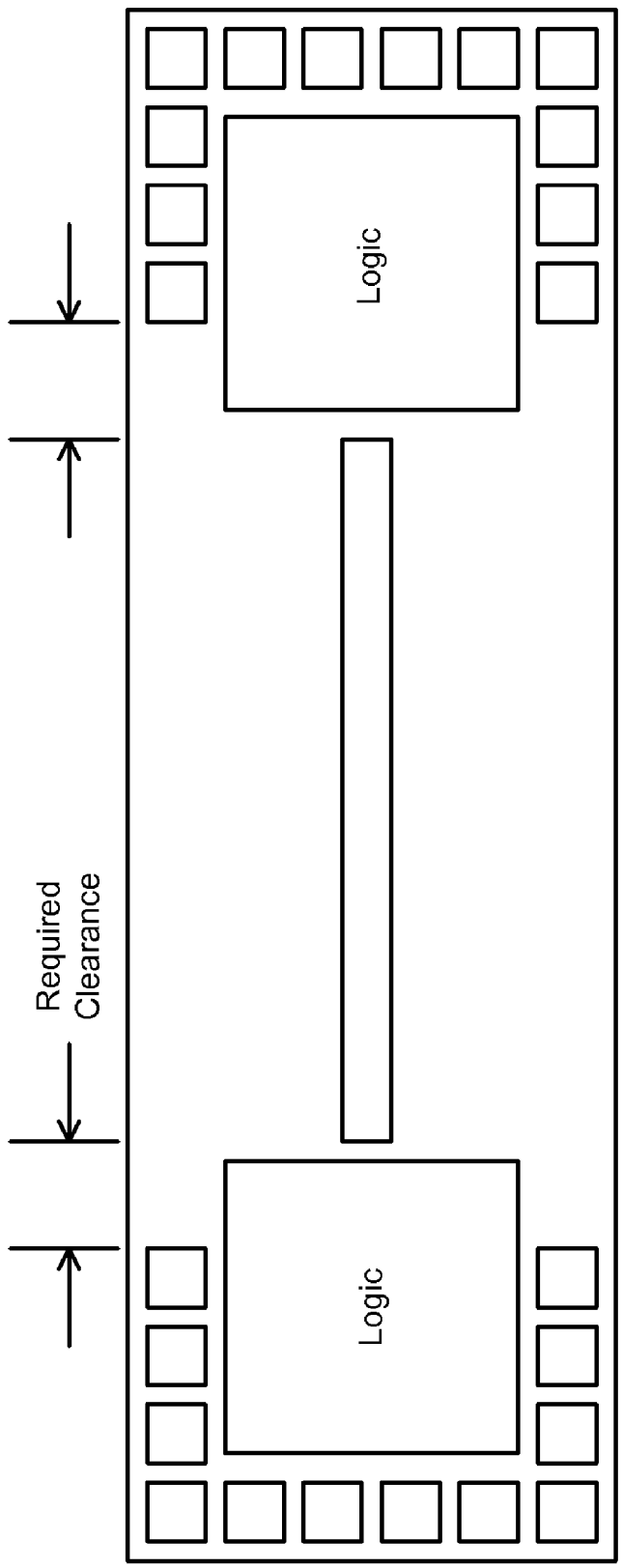
FIG. 1 shows the die map of a prior art fingerprint scanner.

A fingerprint sensor interface according to the present invention connects directly to a camera interface on a host device. Providing a sensor or scanner that connects using a commonly used camera interface allows the fingerprint scanner to be connected with any host that has a camera interface, such as a baseband processor chip set for mobile telephone handsets. Redesign of the host interface is avoided by employing the fingerprint sensor interface of the invention.

In addition to providing an interface to output sensor/scanner data, a fingerprint scanner preferably supports the following interface functions:

Device reset
Pixel scan
Finger detect status
Secure transfer handshake
    Mode selection:
        finger detect—where the device operates with a slow clock to save power
        full scan—capture sensor data at full clock speed
        navigation—used for cursor pointing Control and status of the sensor, including activating all the interface functions, can be through an auxiliary interface such as a standard I²C (inter-integrated circuit) bus or SCI bus. This control interface can be used to selectively enable the sensor by sending a command that activates or deactivates the output signals. When deactivated, a camera connected to the same interface can be enabled.

Standard CMOS digital camera interfaces comprise parallel pixel data, pixel clock, horizontal sync, and vertical sync signals. When the camera interface is used with a camera, a pixel clock accepted from the camera clocks parallel pixel data from the camera into the host device that represents N-bit quantized gray scale or color values. Horizontal and vertical sync signals define the rows and columns of pixels in the image.

Standard CMOS imagers include an oscillator circuit or accept a clock input that is used to derive a pixel clock output to the host processor. An oscillator circuit requires additional pins to connect a crystal and is therefore undesirable in a low cost fingerprint scanner. Preferably, the fingerprint scanner accepts a clock input from the host interface. The input clock can be divided or multiplied within the scanner to generate internal clocks as needed.

Alternatively, an oscillator can be provided on the sensor chip, including without the use of a crystal, and the clock output from the sensor. A non-crystal oscillator may experience variation in the clock frequency causing distortion of the image aspect ratio. Image correction may be used to produce a uniform image size. One technique for correction of image distortion is to measure the interval of sync pulses and expand or contract the image with resampling and interpolation according to the measured error of the sync interval. Fingerprint image processing that corrects for finger swipe velocity variation can provide the correction of image distortion.

A fingerprint scanner according to the present invention comprises an image data interface with the following signals:
   Pixel clock
   Sync
   Pixel data Each signal is a single connection to minimize I/O count. Pixel clock can be driven by the host device. The pixel data is preferably transmitted using a single connection as a serial data stream. Pixel data can be single-bit per pixel or n-bits per pixel. Processing in the host rebuilds n-bit pixel data from the serial data and reorganizes the rows and columns of the data array to create a properly ordered image.

Horizontal and vertical sync signals define the frame boundaries and therefore, given a known number of pixels and bits in a frame, the pixel word boundaries are also defined.

An enable signal driven by the host enables the active state of the sensor output signals. This allows a camera to connect to the same interface as the scanner, where the camera also has an enable signal to activate its output signals. Software processes the data from the camera or sensor differently depending on which device is enabled. The enable signal can come from general purpose digital outputs from the host processor. A single enable signal can be used for both devices by providing complementary active levels of the two devices. Alternatively, the devices can be enabled and disabled using commands sent on the control and status interface.

In one embodiment, the horizontal and vertical sync signal inputs to the host are driven by the same signal to minimize pin count of the sensor. To allow the camera to drive separate horizontal and vertical sync signals while using a single sync signal from the sensor, two resistors or diodes can be connected from the common sync output to the two sync inputs on the host. The diodes or resistors provide isolation between the two sync signals and allow the camera to drive two independent signals.

To insure the ability of the host processing to detect frames of data, the sensor can append to each line a synchronization data pattern recognized by the host processing. Alternatively, a synchronization data pattern can be embedded in place of scan data and can be located in the data field corresponding to the edge or corner of an image to minimize the affect to the area of interest in the center of the scanned image. Alternatively, a full line of horizontal data with a predetermined pattern can be added to the active scan data and used as a synchronization code, then the synchronization line omitted when processing the image.

The camera interface connected to the sensor can be one found in a cellular telephone, laptop computer, digital still-shot camera, or any other device that connects to a two-dimensional imager.

Figure 2:
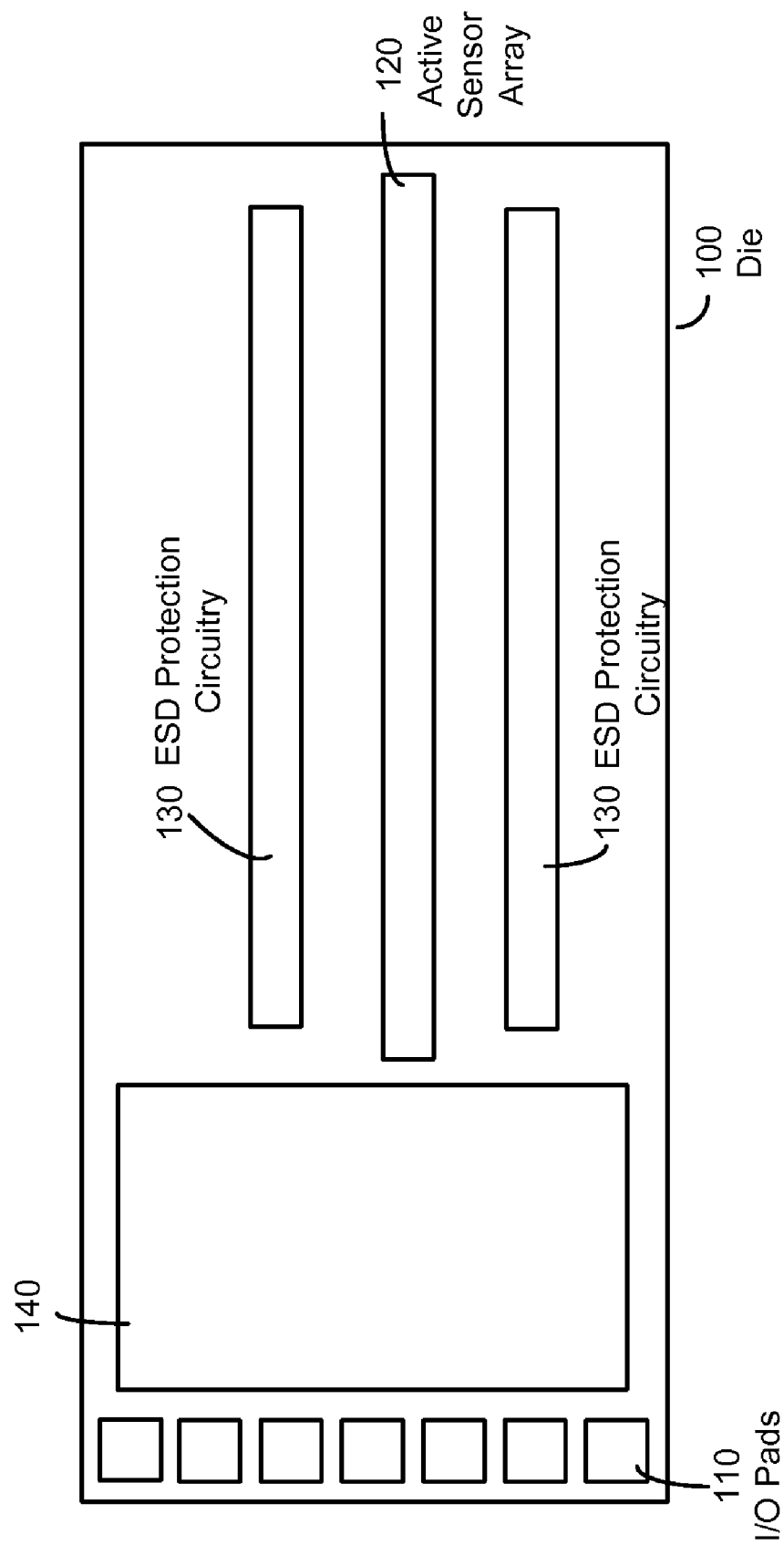
FIG. 2 shows the die map of a fingerprint scanner according to the present invention.

FIG. 2 shows the die map of a fingerprint scanner integrated circuit according to the present invention. The I/O pads 110 are preferably arranged along one edge of the die 100 to minimize extensions of the width of the sensor die. Each I/O pad along the edge increases the die height and therefore the die area and cost. I/O pad count is minimized by the use of the interface of the present invention. The integrated circuit is rectangular in shape with a long dimension and short dimension. The active sensor area 120 has a long axis and a short axis; the long axis is oriented parallel to the long dimension of the integrated circuit. ESD protection circuitry 130 is arranged parallel to the sensor adjacent to the upper and lower edges of the long axis of the sensor area. A column of input and output pads 110 is arranged along one edge of the short dimension if the IC. One, two, or more columns of pads can be used. Other digital and analog circuitry 140 is positioned in between the pads and the sensor, adjacent to one edge of the short axis. The width of the circuitry separates the pads from the sensor and creates a clearance distance.

Figure 3:
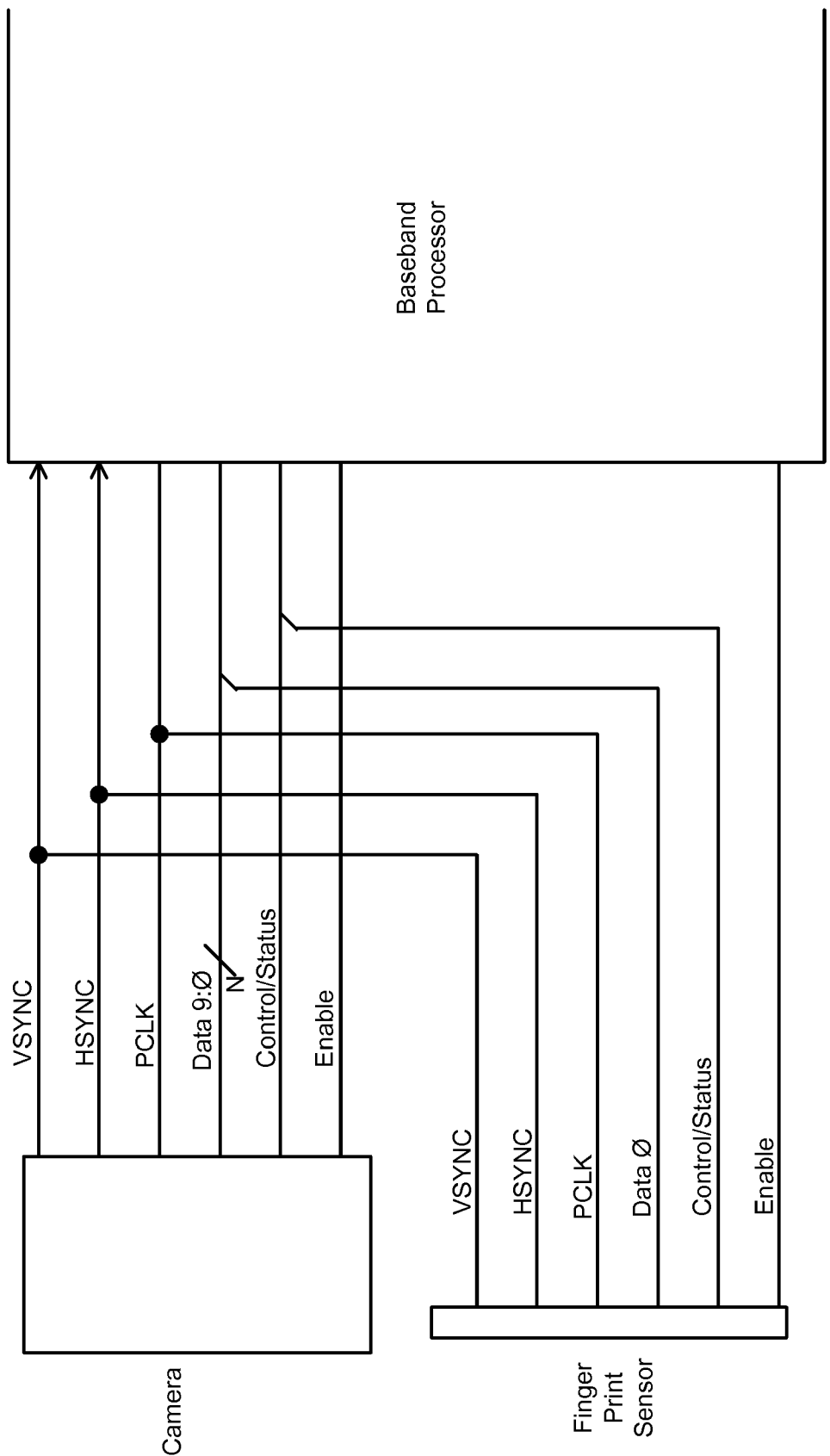
FIG. 3 shows the interface signals of a fingerprint scanner according to the present invention.

FIG. 3 shows the interface signals of a fingerprint scanner according to the present invention. The fingerprint sensor interface is compatible with the interface to a standard camera. Enable function, using discrete lines or the control and status signal, allows both the sensor and the camera to be connected to the same interface and selectively enabled. Alternatively, for applications that do not require a camera, the sensor can be connected without the need for an enable signal. The horizontal and vertical sync signal inputs can be tied together to a single sync output signal from the sensor. The sensor data is input to the processor using one bit of the parallel data bus.

Figure 4:
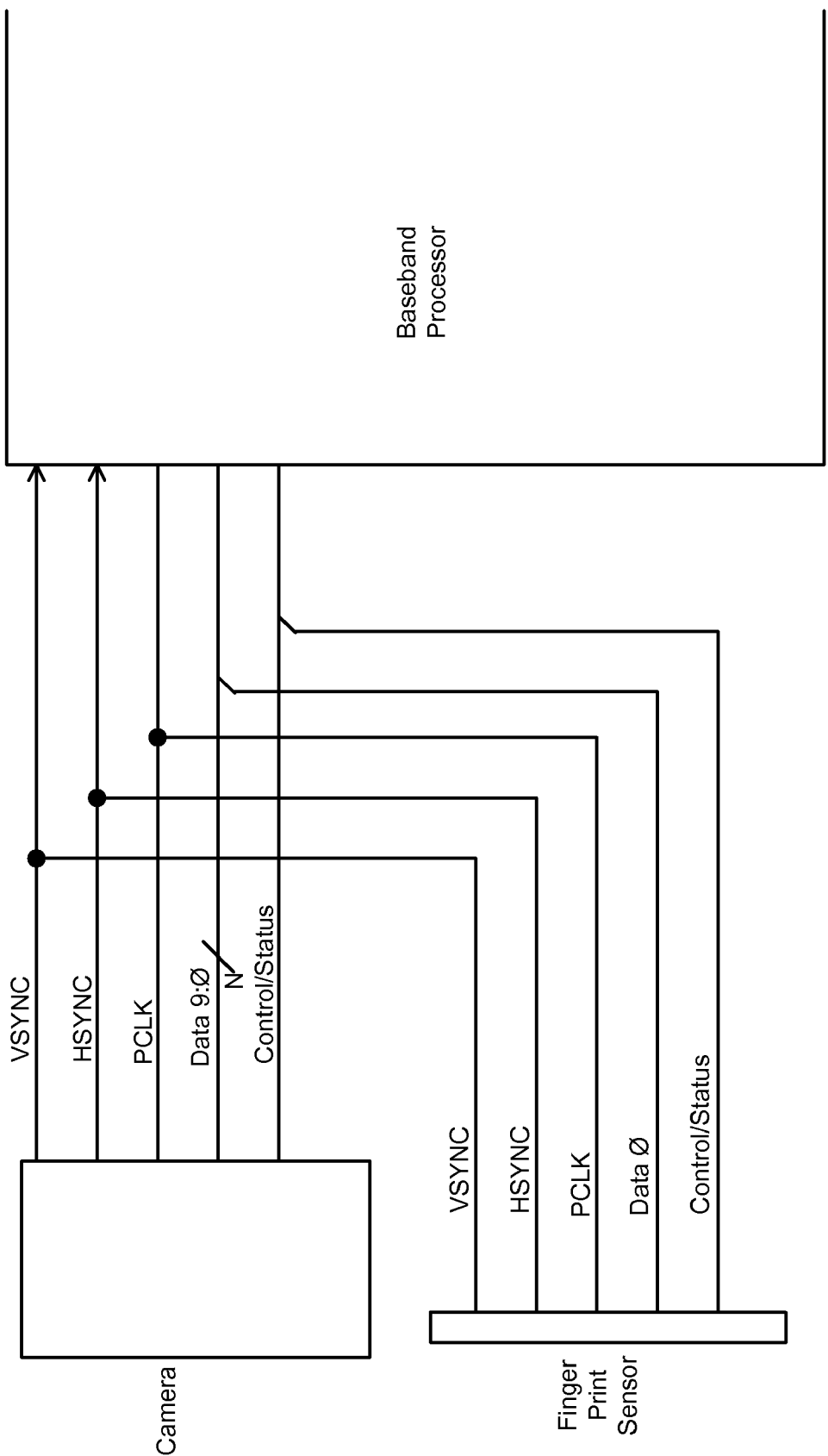
FIG. 4 shows another example of interface signals of the fingerprint scanner.

FIG. 4 shows another example of interface signals of the fingerprint scanner, without the use of a discrete enable signal. The outputs of the camera and fingerprint sensor are enabled using commands over the serial control/status bus. Alternatively, one device can use a discrete enable signal and the other device can use the serial bus for enabling.

Figure 5:
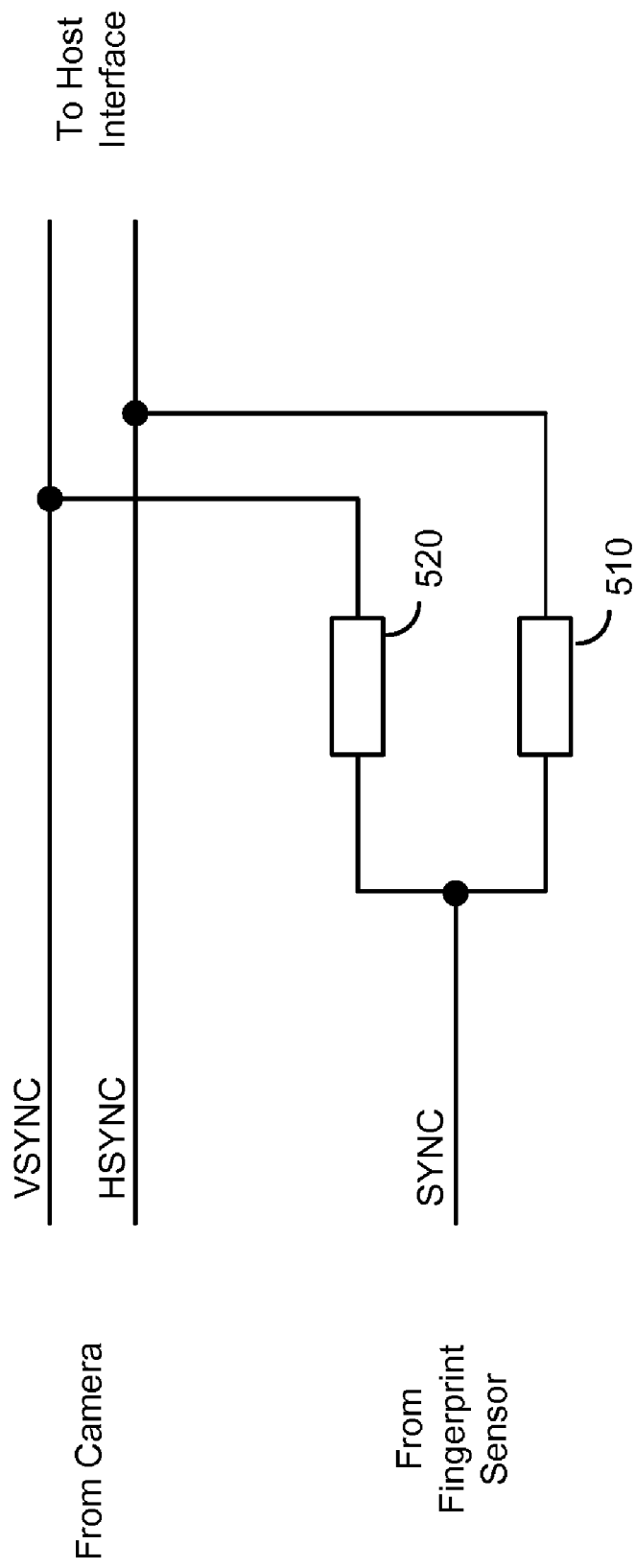
FIG. 5 shows the connection of a single sync signal to an Hsync and Vsync input.

FIG. 5 shows the connection of a single sync signal to Hsync and Vsync inputs. Either diodes or resistors 510 and 520 can be used to provide isolation between the Hsync and Vsync signals.

Figure 6:
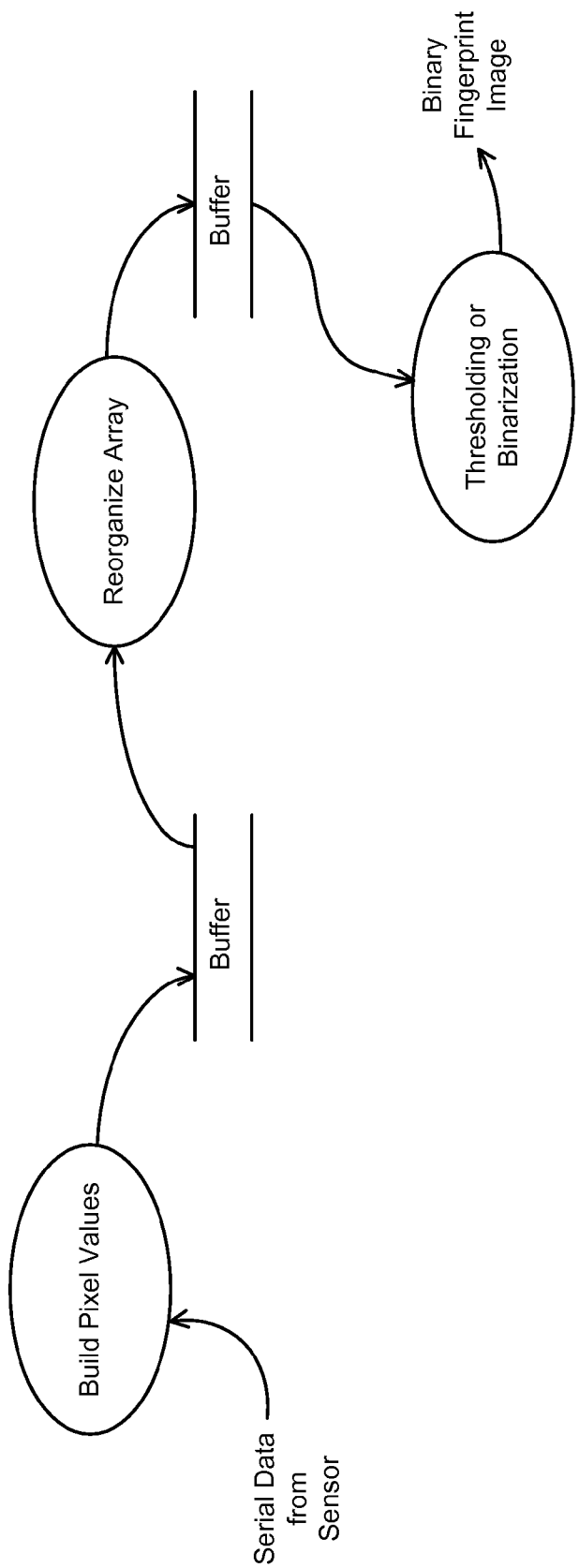
FIG. 6 shows a data flow diagram of the pixel and image data format processing.

FIG. 6 shows a data flow diagram example of the pixel word and image processing for data received from a sensor. Serial data from the sensor is organized into words to build the pixel values. A buffer holds the data between processes. The pixel values are reorganized as needed and stored in a buffer. Thresholding or binarization of the pixel values is performed to create the output binary fingerprint image. In this example, quantized pixel values are transmitted from the sensor. Alternatively, the pixels can be binarized on the sensor chip, and then single-bit pixel values transmitted to the host. The host would not need to build pixel values or binarize the data. The host reorganizes the array data, if needed.

What is claimed is:

1. A fingerprint sensor integrated circuit, rectangular in shape with a long dimension and short dimension, comprising:
 an electrical interface for communicating image data comprising:
  a pixel clock signal for defining data bit intervals;
  pixel data signal for transmitting serial image data;
  a synchronization signal for defining lines and frames of image data;
 wherein pixel data from the sensor is serialized and transmitted on the pixel data signal and wherein the fingerprint sensor connects to a standard camera interface;
 an active sensor area with a long axis and a short axis, the long axis oriented parallel to the long dimension of the integrated circuit;
 electrostatic discharge protection arranged parallel to the sensor long axis adjacent to the upper and lower edges of the long axis of the sensor area;
 at least one column of input and output pads arranged along one edge of the short dimension;
 circuitry positioned in between the pads and the sensor area adjacent to one edge of the short axis of the sensor area; and
 wherein the width of the circuitry separates the pads from the sensor and creates a clearance distance.

2. The fingerprint sensor of claim 1 wherein the standard camera interface is on a cellular telephone baseband processor.

3. The fingerprint sensor of claim 1 wherein the standard camera interface is on a laptop computer.

4. The fingerprint sensor of claim 1 connected to the camera interface simultaneously with a camera.

5. The fingerprint sensor of claim 4 wherein the synchronization signal output from the sensor is connected to the camera interface through a resistor.

6. The fingerprint sensor of claim 4 wherein the synchronization signal output from the sensor is connected to the camera interface through a diode.

7. The fingerprint sensor of claim 1 wherein the pixel data is binarized within the fingerprint sensor and single-bit pixel data values are transmitted.

* * * * *